(12) United States Patent
Sugimura

(10) Patent No.: US 8,587,927 B2
(45) Date of Patent: Nov. 19, 2013

(54) SOLID ELECTROLYTIC CONDENSERS AND METHODS FOR PREPARING THE SAME

(75) Inventor: Naotsugu Sugimura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 123 days.

(21) Appl. No.: 13/090,419

(22) Filed: Apr. 20, 2011

(65) Prior Publication Data

US 2011/0261504 A1    Oct. 27, 2011

(30) Foreign Application Priority Data

Apr. 21, 2010    (JP) .................................. 2010-97708

(51) Int. Cl.
  *H01G 9/02*    (2006.01)
  *H01G 9/00*    (2006.01)
  *B01J 49/00*    (2006.01)
  *C08J 5/20*    (2006.01)

(52) U.S. Cl.
  USPC .............................. 361/525; 361/523; 521/27

(58) Field of Classification Search
  USPC ..................... 361/525, 523; 521/27
  See application file for complete search history.

(56) References Cited

U.S. PATENT DOCUMENTS

2004/0097603 A1 * 5/2004 Hasegawa et al. ............... 521/27
2010/0266928 A1 * 10/2010 Fukuta et al. ................. 429/480

FOREIGN PATENT DOCUMENTS

JP    2001-110688    4/2001
WO    WO2009081812    *  7/2009

* cited by examiner

*Primary Examiner* — Eric Thomas
*Assistant Examiner* — Arun Ramaswamy
(74) *Attorney, Agent, or Firm* — Hamre, Schumann, Mueller & Larson, P.C.

(57) ABSTRACT

The present invention provides solid electrolytic condensers with increased heat resistance and decreased ESR, and methods for preparing the same. The solid electrolytic condensers of the present invention comprise a porous sintered body 1 made of a valve action metal, a dielectric layer 2 covering at least a portion of the porous sintered body 1, and a solid electrolytic layer 3 covering at least a portion of the dielectric layer 2, where the solid electrolytic layer 3 is composed of an anion exchange resin.

13 Claims, 16 Drawing Sheets

SOLID ELECTROLYTIC CONDENSERS AND METHODS FOR PREPARING THE SAME

The present application claims priority to Japanese Patent Application No. 2010-97708, filed Apr. 21, 2010, the subject matter of which is incorporated herein by reference in its entirety.

FIELD OF THE INVENTION

The present invention relates to solid electrolytic condensers comprising a solid electrolytic layer including an anion exchange resin, and methods for preparing the same.

BACKGROUND OF THE INVENTION

Solid electrolytic condensers are widely used for charge accumulation in power supply circuits or noise cancellation in direct current. FIG. 16 shows an example of conventional solid electrolytic condensers (see Japanese Laid-Open Publication No. 2001-110688). The solid electrolytic condenser X shown in FIG. 16 has a structure where a dielectric layer 92, a solid electrolytic layer 93 and an anode conductor layer 94 are stacked on a porous sintered body 91 made of valve action metals such as tantalum. The porous sintered body 91 is obtained by press-molding e.g., fine tantalum powders and then sintering the molded body and has many micropores. FIG. 16 schematically shows the sintered state of fine valve action metal powders where micropores are formed. The dielectric layer 92 may be formed by anodizing the porous sintered body 91 and covers the porous sintered body 91. The solid electrolytic layer 93 is formed to fill in the micropores and covers the dielectric layer 92 all over. The anode conductor layer 94 may have a graphite layer and an Ag layer stacked together, and is joined to the surface of the solid electrolytic layer 93. For the materials of the solid electrolytic layer 93, manganese dioxide or conductive polymers are mainly used.

However, using manganese dioxide as the material for the solid electrolytic layer 93 is problematic in that the equivalent series resistance (hereinafter, ESR) of the solid electrolytic condenser X becomes relatively high. In the meantime, using conductive polymers such as poly(3,4-ethylenedioxythiophene) (PEDT) as the material for the solid electrolytic layer 93 is advantageous for reducing ESR, but is problematic in that heat resistance becomes as low as 125° C. Thus, it was previously difficult to provide a solid electrolytic condenser X having reduced ESR, as well as increased heat resistance.

SUMMARY OF THE INVENTION

The present invention was conceived under the above described circumstances, where the object is to provide solid electrolytic condensers that have both high heat resistance and low ESR, and methods for preparing the same.

According to a first aspect of the present invention, there is provided a solid electrolytic condenser comprising: a porous sintered body made of valve action metal; a dielectric layer covering at least a portion of the porous sintered body; and a solid electrolytic layer covering at least a portion of the dielectric layer, where the solid electrolytic layer is made of an anion exchange resin.

In one embodiment of the present invention, the anion exchange resin has a copolymer of tetrafluoroethylene with perfluorovinylether.

In another embodiment of the present invention, the anion exchange resin has $-SO_3^-NH_3^+CH_2CH_2NH_3^+$ as an ion exchange group.

In another embodiment of the present invention, the anion exchange resin has a copolymer of tetrafluoroethylene with perfluorovinylether and $-SO_3^-NH_3^+CH_2CH_2NH_3^+$ as an ion exchange group, which is represented by Formula 1 below.

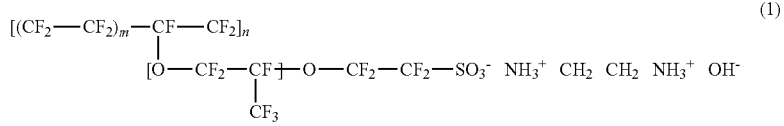

(1)

(where m and n are integers)

In another embodiment of the present invention, the anion exchange resin has $OH^-$ as an anion.

In another embodiment of the present invention, the anion exchange resin has a grid structure where a number of fluorocarbon clusters are bonded to each other.

In another embodiment of the present invention, the anion exchange resin is a quaternarized ammonium-based anion exchange resin.

In another embodiment of the present invention, the anion exchange resin is a quaternarized poly(4-vinylpyridine) represented by Formula 2 below.

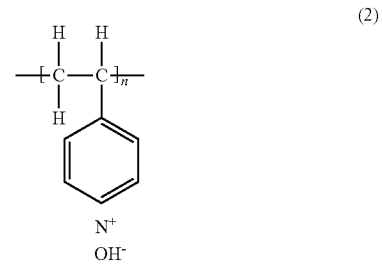

(2)

(where n is an integer)

In another embodiment of the present invention, the anion exchange resin has $OH^-$ as an anion.

The above anion exchange resins may have comparable electrical resistances and higher heat resistances, as compared to conductive polymers. Further, the above anion exchange resins may have lower electrical resistances, as compared to manganese dioxide. Thus, it becomes possible to provide solid electrolytic condensers having decreased ESR while having increased heat resistance.

According to a second aspect of the present invention, there is provided a method for preparing a solid electrolytic condenser comprising: forming a dielectric layer covering at least a portion of a porous sintered body made of valve action metal; and forming a solid electrolytic layer composed of an anion exchange resin that is stacked on the dielectric layer.

In one embodiment of the present invention, the process of forming a solid electrolytic layer comprises forming a layer composed of a copolymer of tetrafluoroethylene with perfluorovinylether having a sulfonic acid group that is represented by Formula 3 below on the dielectric layer, and subjecting the layer to a reaction with ethylenediamine.

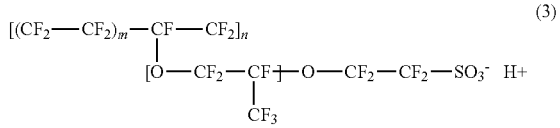

(3)

(where m and n are integers)

In another embodiment of the present invention, the process of forming a solid electrolytic layer comprises depositing a quaternarized ammonium-based anion exchange resin on the dielectric layer.

In another embodiment of the present invention, the process of forming a solid electrolytic layer comprises immersing the porous sintered body on which the dielectric layer is formed in a polymerization solution where 4-vinylpyridine of Formula 4 below is dissolved, and carrying out polymerization to deposit poly(4-vinylpyridine) of Formula 5 below on the dielectric layer; and then subjecting poly(4-vinylpyridine) that is deposited on the dielectric layer to quaternarization.

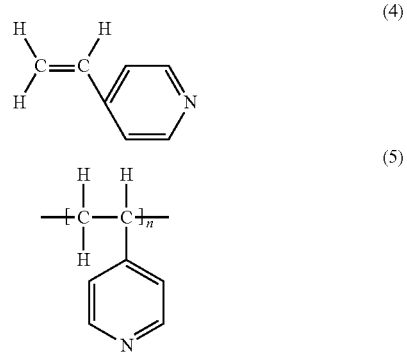

Additional aspects and features of the present invention will become more apparent from the following description of illustrative embodiments provided in conjunction with the accompanying drawings.

DETAILED DESCRIPTION OF THE INVENTION

Specific embodiments of the present invention will be described below in detail with reference to the accompanying drawings.

Figure 1:
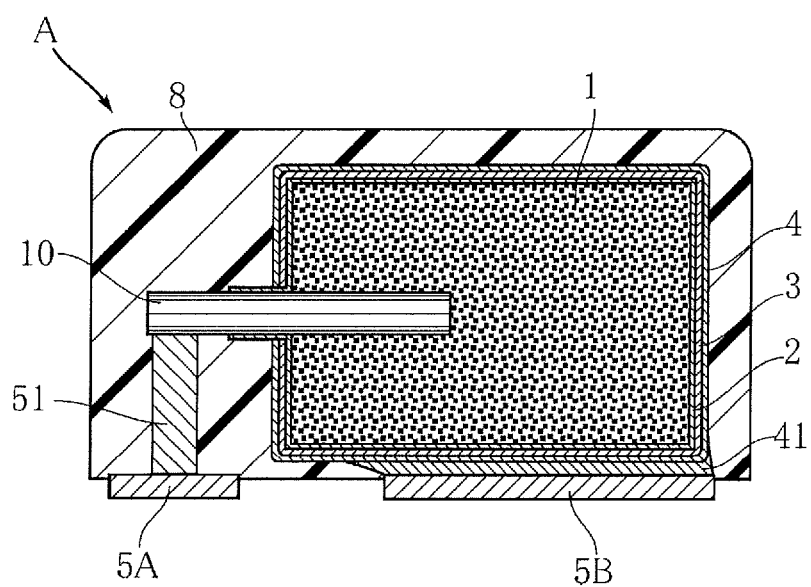
FIG. 1 shows a sectional view of a solid electrolytic condenser according to the first embodiment of the present invention.
Figure 2:
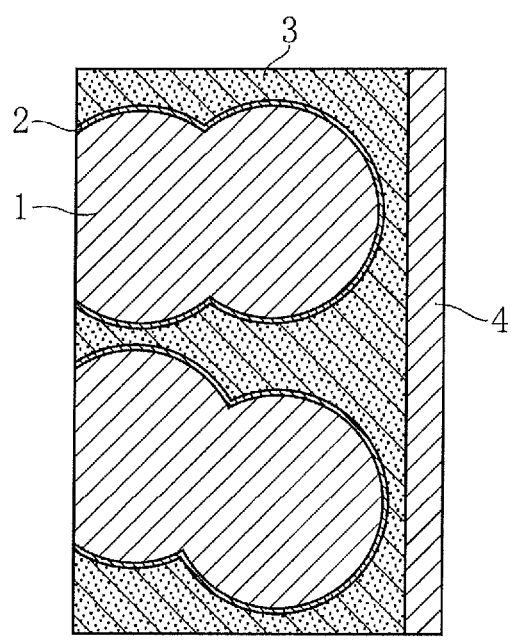
FIG. 2 shows an enlarged sectional view of the principal part of a solid electrolytic condenser according to the first embodiment of the present invention.

FIGS. 1 and 2 show a solid electrolytic condenser according to the first embodiment of the present invention. The solid electrolytic condenser A includes a porous sintered body 1, a cathode wire 10, a dielectric layer 2, a solid electrolytic layer 3, an anode conductor layer 4, a cathode terminal 5A, an anode terminal 5B and a resin package 8.

The porous sintered body 1 is made of valve action metals such as niobium and tantalum, and has a structure where multiple micropores are formed. A cathode wire 10 projects from the porous sintered body 1. The cathode wire 10 is made of valve action metals such as niobium and tantalum, and a portion thereof extends into the porous sintered body 1.

The dielectric layer 2 is formed on the surface of the porous sintered body 1 and may be made of valve action metal oxides, such as niobium pentoxide and tantalum pentoxide. While FIG. 1 illustrates, for easy understanding, the dielectric layer 2 covering the outer surface of the porous sintered body 1, in practice, the dielectric layer 2 covers the micropores of the porous sintered body 1, as shown in FIG. 2.

The solid electrolytic layer 3 is mounted on the dielectric layer 2, and as shown in FIG. 2, is formed to fill in the micropores of the porous sintered body 1. The solid electrolytic layer 3 is composed of an anion exchange resin, specifically those based on copolymers of tetrafluoroethylene with perfluorovinylether and having —SO$_3^-$NH$_3^+$CH$_2$CH$_2$NH$_3^+$ as an ion exchange group that are represented by Formula 1 above.

The anode conductor layer 4 may be a graphite layer and an Ag layer stacked together and covers the solid electrolytic layer 3. The anode conductor layer 4 is bonded to an anode terminal 5B via a conductive adhesive layer 41 that is composed of e.g., Ag paste. As a result, the solid electrolytic layer 3 is electrically connected to the anode terminal 5B.

The cathode terminal 5A may be an element in a plate form that is made of Cu, Ni or alloys thereof, and is electrically connected to the cathode wire 10 via a conductive member 51. The cathode terminal 5A may be used for surface-mounting the solid electrolytic condenser A on a circuit substrate.

The anode terminal 5B may be an element in a plate form that is made of Cu, Ni or alloys thereof, and is electrically connected to the solid electrolytic layer 3 via an anode conductor layer 4. The anode terminal 5B is used for surface-mounting the solid electrolytic condenser A.

The resin package 8 may be composed of black epoxy resin, and covers the porous sintered body 1, the dielectric layer 2, the solid electrolytic layer 3, the anode conductor layer 4 and the cathode wire 10 to protect them. In the cathode terminal 5A and the anode terminal 5B, a portion that is exposed from the resin package 8 is used for surface-mounting.

Further, an illustrative method for preparing the solid electrolytic condenser A is described below.

First, fine powders of valve action metals such as tantalum and niobium are press-molded with the cathode wire 10, and the molded product is sintered to obtain a porous sintered body 1. Then, the porous sintered body 1 may be immersed in an aqueous phosphoric acid solution, where anodization is performed to form a dielectric layer 2.

Figure 3:
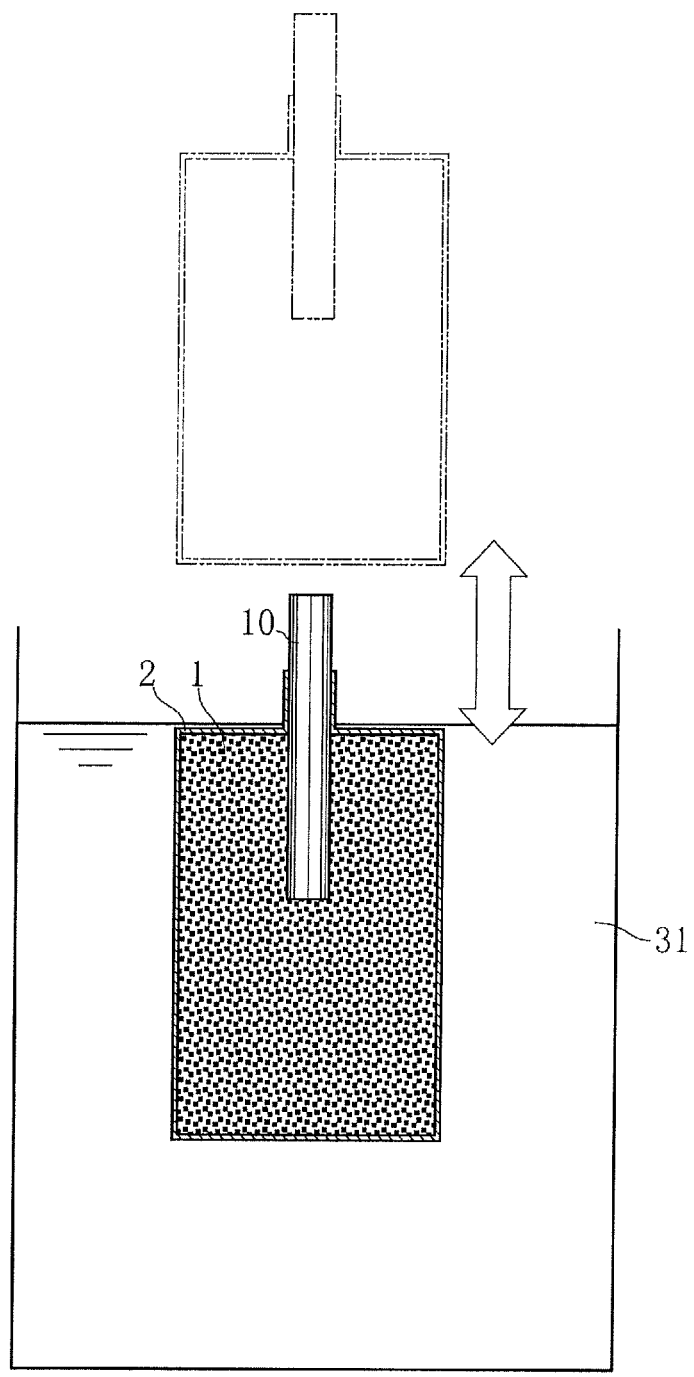
FIG. 3 shows a sectional view of a process for forming an intermediate layer in an illustrative method for preparing a solid electrolytic condenser according to the first embodiment of the present invention.

Next, as shown in FIG. 3, a work-up solution 31 is prepared. The work-up solution 31 is a Nafion® (DuPont) solution that comprises water and ethanol as the main solvent. Nafion® (DuPont) is based on copolymers of tetrafluoroethylene with perfluorovinylether and has a sulfonic acid group as an ion exchange group, which is represented by Formula 3 above.

Figure 4:
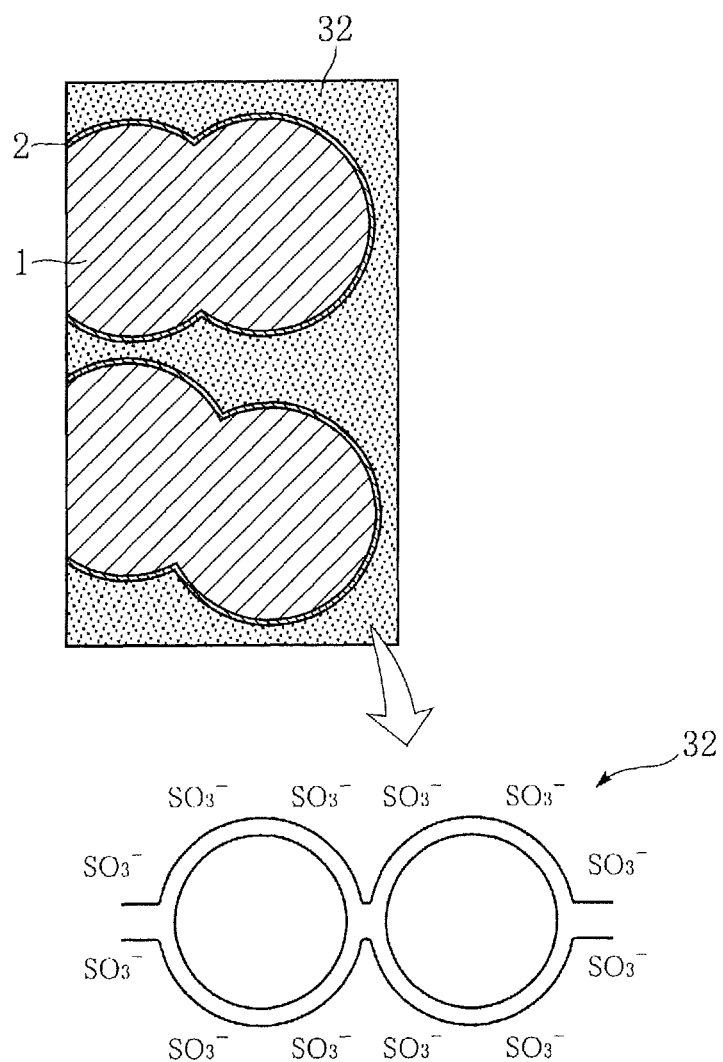
FIG. 4 shows an enlarged sectional view of the principal part of an intermediate layer formed in an illustrative method for preparing a solid electrolytic condenser according to the first embodiment of the present invention.

As shown in FIG. 3, the porous sintered body 1 on which the dielectric layer 2 is formed is immersed in the work-up solution 31, whereby the work-up solution 31 penetrates into the micropores of the porous sintered body 1. If the porous sintered body 1 is taken out of the work-up solution 31, Nafion® (DuPont) attaches to the dielectric layer 2. By repeating the immersion and the taking out alternately, an intermediate layer 32 is formed, as shown in FIG. 4. The intermediate layer 32 is filling in the micropores of the porous sintered body 1. In the meantime, the intermediate layer 32 has an aggregate structure that is referred to as a cluster network, as shown in the enlarged view of FIG. 4. Specifically, since it forms a grid structure where a number of fluorocarbon clusters having a diameter of about 40 Å are bound to each other with a pitch of about 50 Å, sulfonic acid groups are uniformly distributed around the clusters. The cluster network is easily formed due to the work-up solution 31 comprising Nafion® (DuPont) and water.

Then, the porous sintered body 1 on which the intermediate layer 32 is formed is cleaned with water to remove the impurities, and adequately dried to remove the residual moisture. However, drying at a high temperature such that moisture is completely removed from the intermediate layer 32 may result in the collapse of the cluster network, and thus, some moisture is allowed to remain so that the cluster network can be maintained.

Thereafter, the porous sintered body 1 on which the intermediate layer 32 is formed is immersed in ethylenediamine. Since the intermediate layer 32 has a cluster network structure, ethylenediamine penetrates throughout the intermediate layer 32. Further, the sulfonic acid group reacts with ethylenediamine to form —SO$_3^-$NH$_3^+$CH$_2$CH$_2$NH$_3^+$ as an ion exchange group that is shown in Formula 1, whereby a solid electrolytic layer 3 is obtained. After immersion in ethylenediamine, the porous sintered body 1 on which the solid electrolytic layer 3 is formed may be cleaned in boiling water and then dried. Since water is used in this treatment, OH ions come into existence near the ion exchange group of the solid electrolytic layer 3, as shown in Formula 1.

Subsequently, a graphite layer and an Ag layer are stacked together on the solid electrolytic layer 3 to form an anode conductor layer 4. Then, the cathode wire 10 and the conductive member 51 may be bonded together using laser welding. Further, the cathode terminal 5A is bonded to the conductive member 51 to join the anode terminal 5A to the anode conductor layer 4. Further, the resin package 8 may be formed by mold-molding using epoxy resin materials. Through the procedures described above, the solid electrolytic condenser A is finished.

Next, operation of the solid electrolytic condenser A and methods for preparing the same are described.

Anion exchange resins have comparable electrical resistances and higher heat resistances, as compared to conductive polymers. The solid electrolytic layer 3 of the present invention has a heat resistance of about 180° C., whereas conductive polymers have a heat resistance of about 125° C. Also, anion exchange resins have lower electrical resistances, as compared to manganese dioxide, which results in a solid electrolytic layer 3 according to the present invention having an electrical resistance of about 1/10 of that of manganese dioxide. This allows a solid electrolytic condenser A to have increased heat resistance as well as decreased ESR. In particular, among anions, OH$^-$ is a very fast moving anion, and it is therefore desirable that the solid electrolytic layer 3 has OH$^-$ as an anion for reducing ESR.

By immersing the porous sintered body 1 on which a dielectric layer 2 is formed in a work-up solution 31, on the dielectric layer 2 is formed an intermediate layer 32 having a cluster network structure. As a result, even after the intermediate layer 32 is formed to fill in the micropores of the porous sintered body 1, ethylenediamine penetrates throughout the intermediate layer 32. This allows OH$^-$ to exist throught the solid electrolytic layer 3, thereby making it possible to decrease ESR of the solid electrolytic condenser A without detrimentally reducing the capacity.

In addition, a solid electrolytic condenser according to the second embodiment of the present invention is described. In this embodiment, anion exchange resins used for the solid electrolytic layer 3 differ from those used in the embodiments described above. Specifically, quaternarized ammonium-based anion exchange resins may be used and the examples include quaternarized poly(4-vinylpyridine) represented by Formula 2.

An illustrative method for preparing a solid electrolytic condenser A of the present invention is described below.

First, the porous sintered body 1 and the dielectric layer 2 that are shown in FIG. 3 are formed. Further, a polymerization solution where 4-vinylpyridine monomer represented by Formula 4 is dissolved in an alcohol is prepared.

Then, the porous sintered body 1 on which the dielectric layer 2 is formed is immersed into the polymerization solution. Polymerization may be accelerated by using organometals as a catalyst. As a result, poly(4-vinylpyridine) represented by Formula 5 is deposited on the dielectric layer 2.

By repeated polymerization, poly(4-vinylpyridine) gradually fills in the micropores of the porous sintered body 1. Thereafter, poly(4-vinylpyridine) is subjected to quaternization. Specifically, deposited poly(4-vinylpyridine) may be subjected to a reaction with methyl bromide to obtain a quaternarized poly(4-vinylpyridine) that is represented by Formula 6 below.

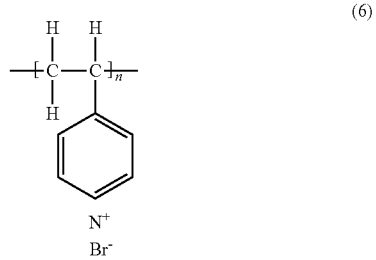

(6)

(where n is an integer)

The quaternarized poly(4-vinylpyridine) represented by Formula 6 has Br⁻ as an anion. By subjecting the quaternarized poly(4-vinylpyridine) to treatment using an alkali, the solid electrolytic layer 3 composed of quaternarized poly(4-vinylpyridine) having OH⁻ as an anion shown in FIG. 2 may be obtained. Alternatively, with treatment using chlorine instead of alkali, the solid electrolytic layer 3 composed of quaternarized poly(4-vinylpyridine) having Cl as an anion may be obtained.

This embodiment also allows a solid electrolytic condenser A to have increased heat resistance as well as decreased ESR.

FIGS. 5-15 show modified examples of the first embodiment and the second embodiment of the present invention. For FIGS. 5-15, the same reference numbers are used to designate the same or similar elements as the embodiments described above. In these modified examples, either feature of the first embodiment or the second embodiment may be applied to the solid electrolytic layer 3.

Figure 5:
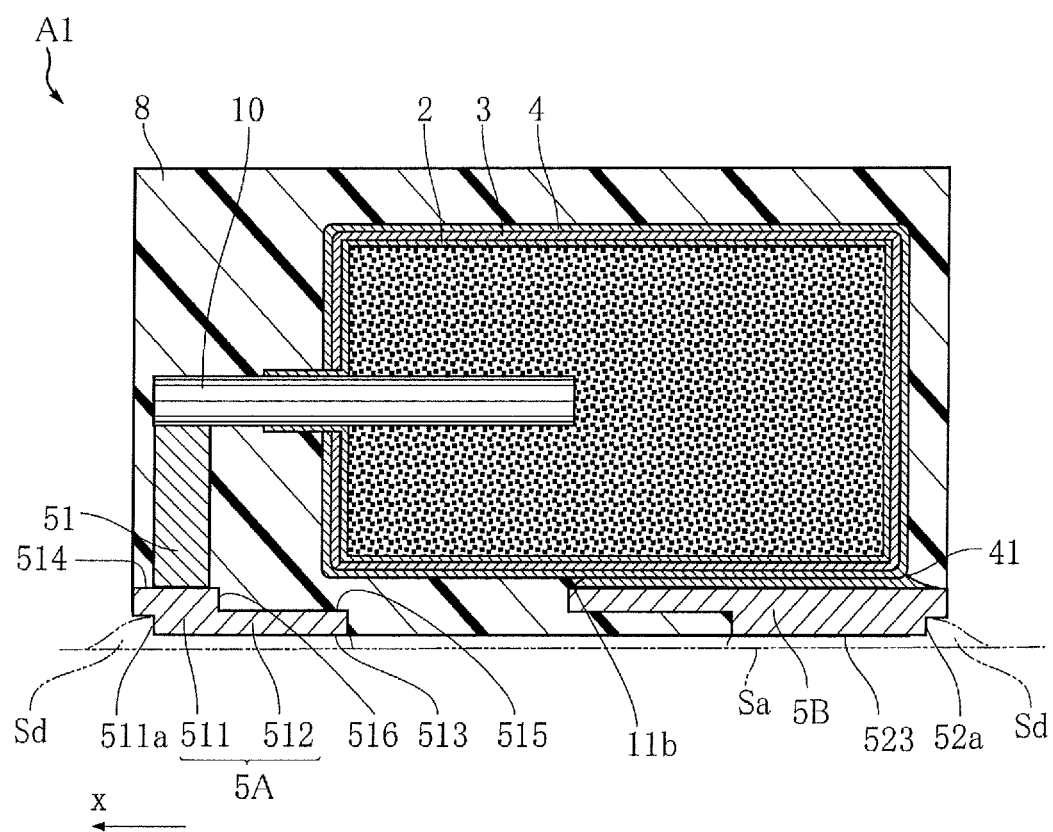
FIG. 5 shows a sectional view of a first modified example of a solid electrolytic condenser according to the present invention.

FIG. 5 shows a first modified example of the solid electrolytic condenser according to the present invention. The solid electrolytic condenser A1 of this modified example differs in the configuration of cathode terminal 5A and anode terminal 5B, as compared to that of the above mentioned embodiments. The solid electrolytic condenser A1 may be used surface-mounted on a circuit substrate (Sa). The solid electrolytic condenser A1 may have a longitudinal dimension of 0.8 mm, a transverse dimension of 1.6 mm and a depth dimension of 0.85 mm, in FIG. 1.

The cathode terminal 5A supports the conductive member 51 and is electrically connected to the cathode wire 10 via a conductive member 51. A portion of the cathode terminal 5A is exposed from the resin package 8. The portion of the cathode terminal 5A that is exposed from the resin package 8 is indicated as a mounting face 513 for surface-mounting the solid electrolytic condenser A1 on a circuit substrate (Sa). The mounting face 513 is bonded to a circuit substrate (Sa) by Sd welding, whereby the solid electrolytic condenser A1 is mounted on the circuit substrate (Sa).

The cathode terminal 5A includes a thick part 511, and a thin part 512 having a thickness (dimension in the longitudinal direction of FIG. 1) lower than that of the thick part 511. The face of the thick part 511 which is on the opposite side of the mounting face 513 is indicated as a supporting face 514 supporting the conductive member 51. The supporting face 514 and the mounting face 513 are parallel to each other. On the x-direction portion of the thick part 511 is formed a fillet part 511a that is dented from the mounting face 513 to the supporting face 514. As a result, a portion of Sd welding for bonding the mounting face 513 to a circuit substrate (Sa) may be formed as a welding fillet.

The thin part 512 is formed to prevent the cathode terminal 5A from contacting the anode conductor layer 4 or the solid electrolytic layer 3. The face of the thin part 512 which is on the opposite side of the mounting face 513 is indicated as a backward face 515. The backward face 515 and the mounting face 513 are parallel to each other. The backward face 515 in the cathode terminal 5A is on the opposite end of the x-direction. Since the backward face 515 is a portion of the thin part 512, the distance from the backward face 515 to the mounting face 513 is shorter than that from the supporting face 514 to the mounting face 513. The backward face 515 is not necessarily oriented parallel to the mounting face 513, and may be a face that gradually approaches the mounting face 513 as directed toward the opposite side of the x-direction from the supporting face 514. In the present modified example, the backward face 515 is connected to the supporting face 514 via a standing face 516. The standing face 516 is vertical to the backward face 515 and extends out from the backward face 515 to the supporting face 514.

The anode terminal 5B is electrically connected to the solid electrolytic layer 3 via the conductive adhesive layer 41 and the anode conductor layer 4. A portion of the anode terminal 5B is exposed from the resin package 8. The portion of the anode terminal 5B that is exposed from the resin package 8 is indicated as a mounting face 523 for surface-mounting the solid electrolytic condenser A1 on a circuit substrate (Sa). The mounting face 523 is bonded to a circuit substrate (Sa) by Sd welding, whereby the solid electrolytic condenser A1 is mounted on the circuit substrate (Sa). If the area of the mounting face 523 is the same as that of the mounting face 513, it is effective for self-alignment. On the opposite side of the x-direction of the anode terminal 5B is formed a fillet part 52a, as on the cathode terminal 5A. It is desirable that the face of the anode terminal 5B that is on the opposite side of the mounting surface 523 is larger, from the standpoint of reducing ESR.

This modified example also allows a solid electrolytic condenser A1 to have increased heat resistance as well as decreased ESR.

Figure 6:
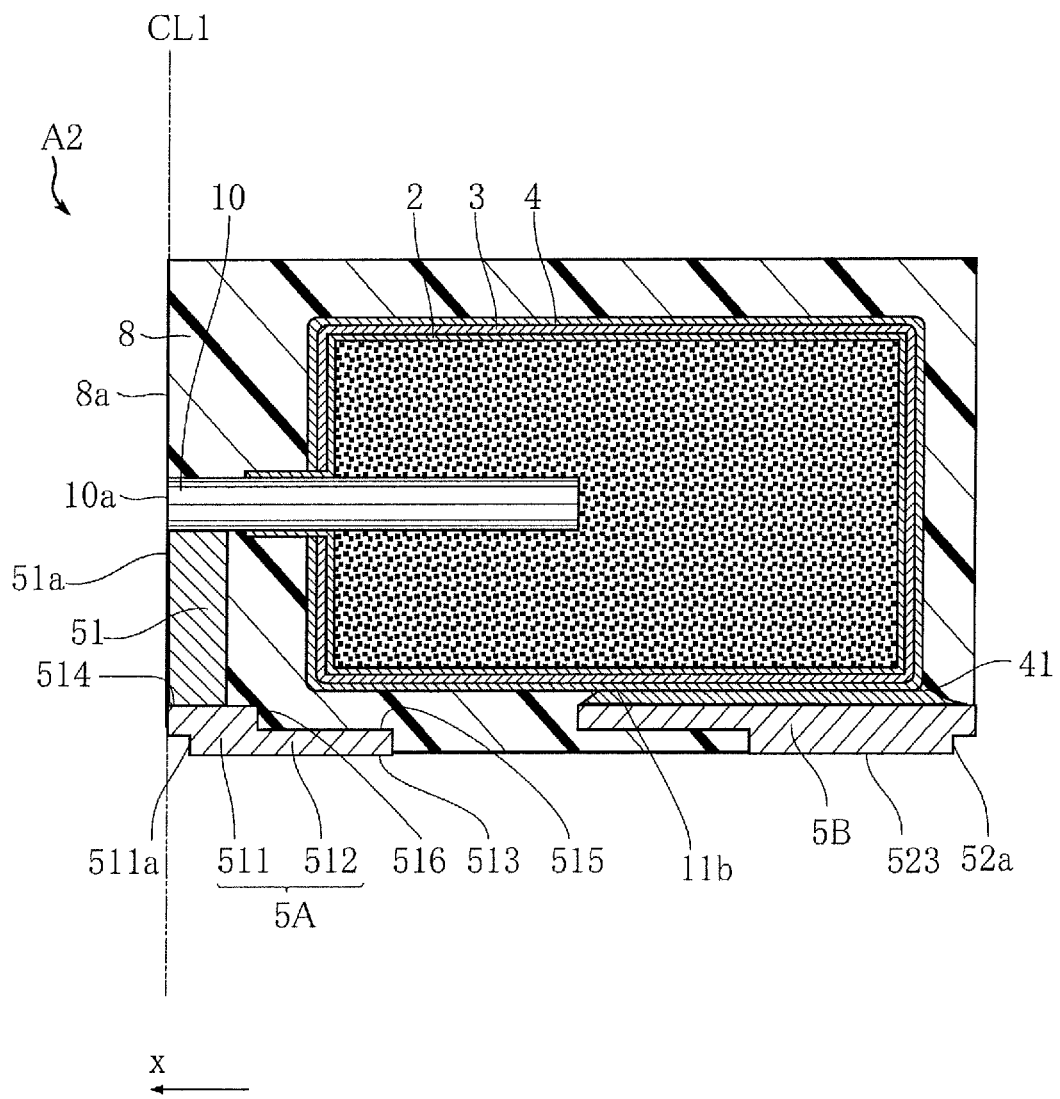
FIG. 6 shows a sectional view of a second modified example of a solid electrolytic condenser according to the present invention.

FIG. 6 shows a second modified example of a solid electrolytic condenser according to the present invention. The solid electrolytic condenser A2 shown in FIG. 6 differs from the solid electrolytic condenser A1 in that the cathode wire 10 and the conductive member 51 are exposed from the resin package 8. The end face 10a of the cathode wire 10, the end face 51a of the conductive member 51 and the end face 8a of the resin package 8 are on the same plane. The solid electrolytic condenser A2 is obtained by cutting along the cutting line CL1.

This modified example also allows a solid electrolytic condenser A2 to have increased heat resistance as well as decreased ESR.

Figure 7:
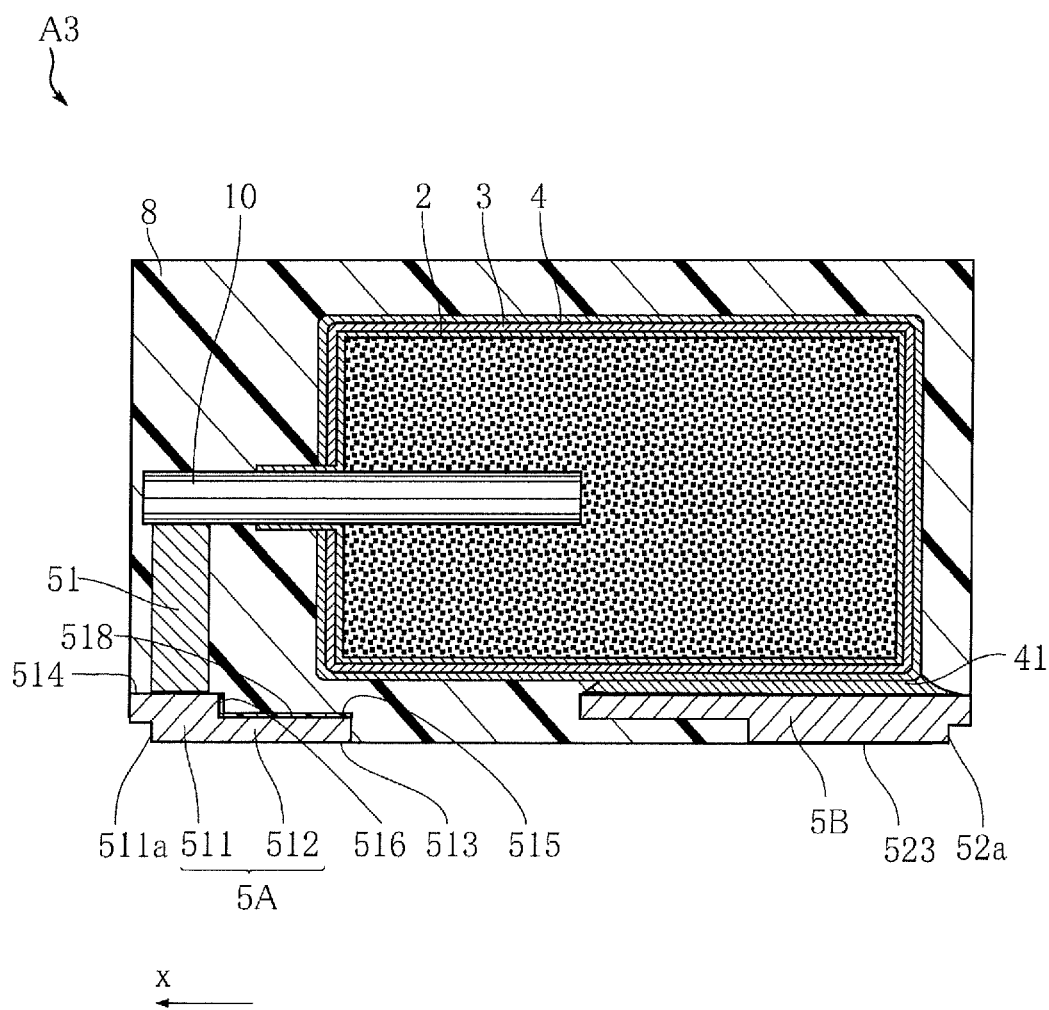
FIG. 7 shows a sectional view of a third modified example of a solid electrolytic condenser according to the present invention.

FIG. 7 shows a third modified example of a solid electrolytic condenser according to the present invention. The solid electrolytic condenser A3 shown in FIG. 7 differs from the solid electrolytic condenser A1 in that it further has an insulation layer 518 being formed on the backward face 515 and the standing face 516, which makes it possible to prevent the cathode terminal 5A from coming into contact with the anode conductor layer 4 or the solid electrolytic layer 3 and being electrically connected therebetween.

This modified example also allows a solid electrolytic condenser A3 to have increased heat resistance as well as decreased ESR.

Figure 8:
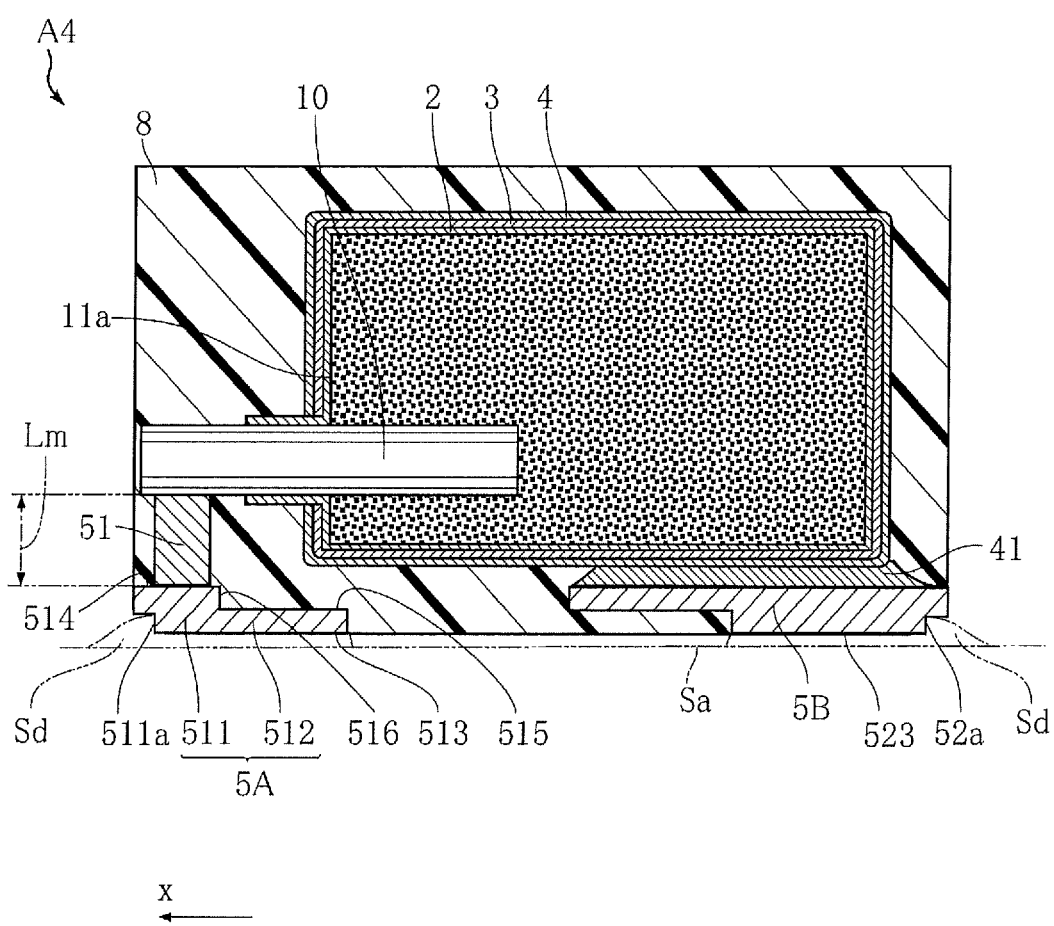
FIG. 8 shows a sectional view of a fourth modified example of a solid electrolytic condenser according to the present invention.

FIG. 8 shows a fourth modified example of a solid electrolytic condenser according to the present invention. The solid electrolytic condenser A4 shown in FIG. 8 differs from the embodiments and modified examples described above in that the cathode wire 10 does not protrude from the center portion of the face 11a of the porous sintered body 1, but protrudes from a portion off the center of the face 11a.

This modified example also allows a solid electrolytic condenser A4 to have increased heat resistance as well as decreased ESR.

Further, according to the solid electrolytic condenser A4, the conductive member 51 can have a decreased dimension (Lm) in the longitudinal direction of FIG. 8. If the dimension (Lm) is small, the conductive member 51 is difficult to be deformed when bonded to the cathode wire 10. Accordingly, according to the solid electrolytic condenser A4, the problems where the conductive member 51 would not properly be bonded to the cathode mounting terminal 5A due to deformation can be solved.

Figure 9:
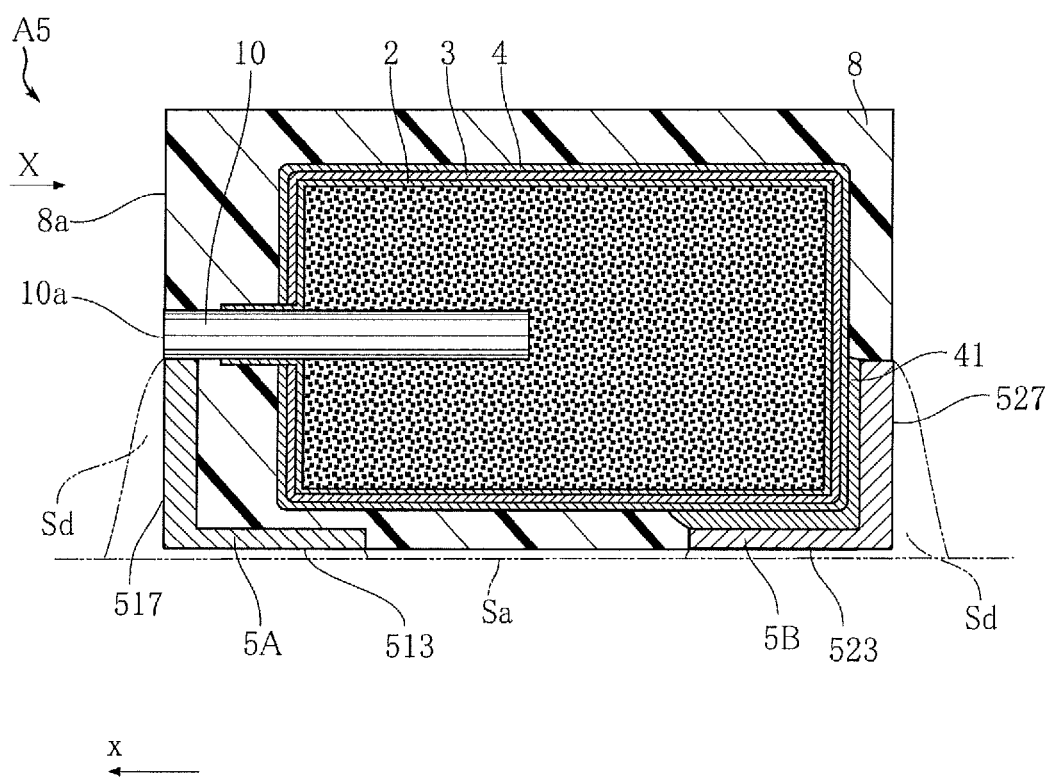
FIG. 9 shows a sectional view of a fifth modified example of a solid electrolytic condenser according to the present invention.
Figure 10:
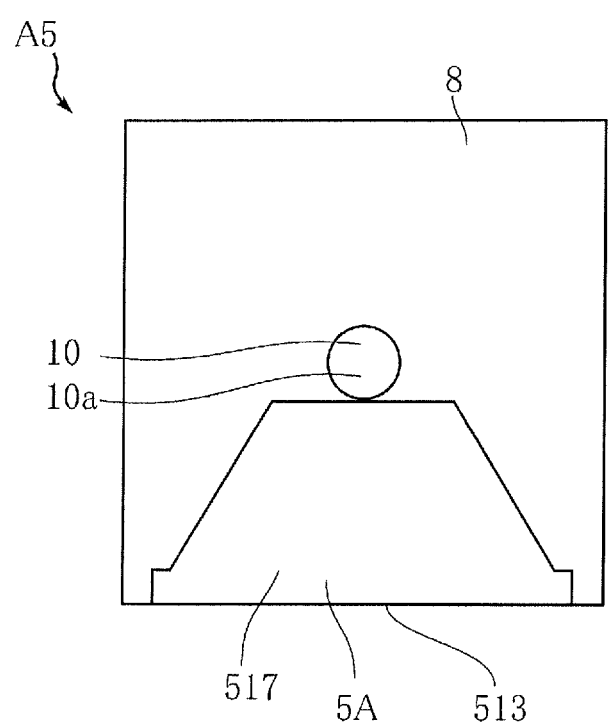
FIG. 10 shows a side view taken along the x-direction of FIG. 9.
Figure 11:
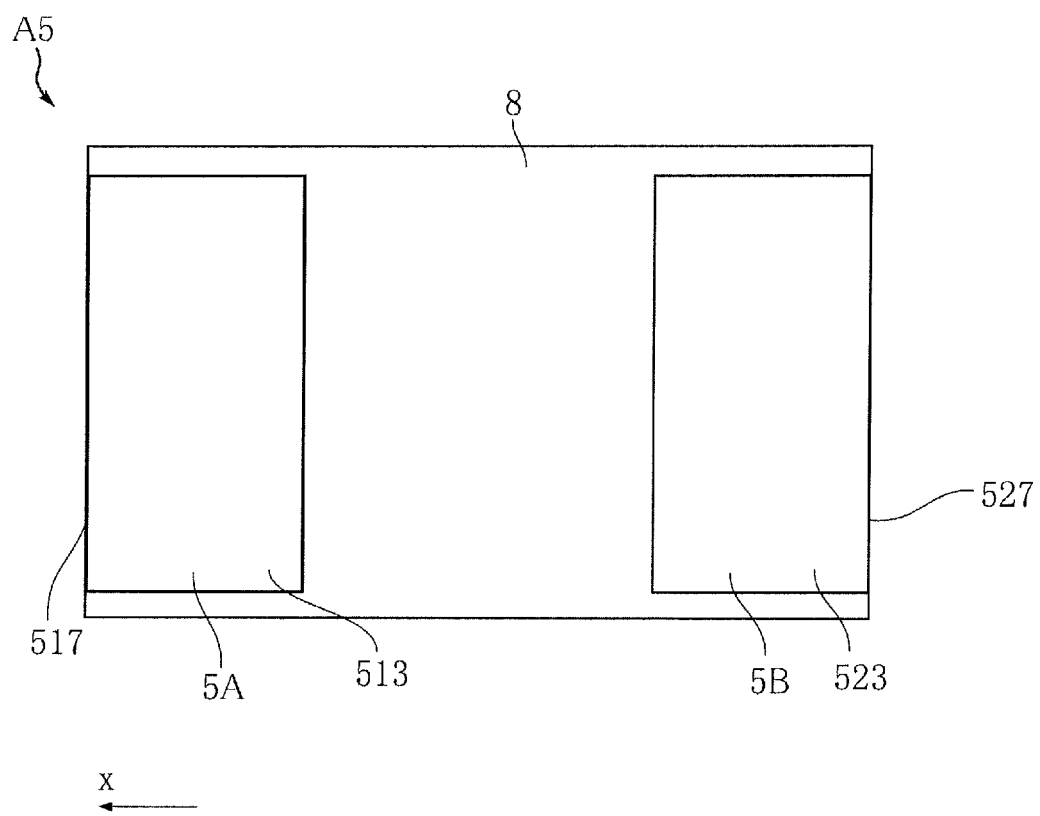
FIG. 11 shows a bottom view of a fifth modified example of a solid electrolytic condenser according to the present invention.

FIGS. 9-11 show a fifth modified example of a solid electrolytic condenser according to the present invention. The solid electrolytic condenser A5 shown in FIGS. 9-11 differs from the embodiments and modified examples described above in that it has no conductive member 51, but has L-shaped cross sections of the cathode terminal 5A and the anode terminal 5B.

The cathode wire 10 has an end face 10a that is exposed from the resin package 8. The cathode terminal 5A has a mounting face 513 and an end face 517. The mounting face 513 and the end face 517 are exposed from the resin package 8. The mounting face 513 and the end face 517 are rectangular in shape. As shown in FIG. 10, in this embodiment, the end face 517 is trapezoid in shape. The end face 517 and the end face 10a of the cathode wire 10 are on the same plane. The cathode terminal 5A is formed by bending a surface-plated member in a plate form. Both the mounting face 513 and the end face 517 are thus plated. Thus, when the solid electrolytic condenser A5 is mounted on a circuit substrate (Sa), Sd welding for bonding to a circuit substrate (Sa) can be attached not only to the mounting face 513 but also to the end face 517. This allows welding fillets having a high visibility to be formed.

The anode terminal 5B has a mounting face 523 and an end face 527. The mounting face 523 and the end face 527 are exposed from the resin package 8. The mounting face 523 and the end face 527 have rectangular shapes. Like the cathode terminal 5A, the anode terminal 5B may be formed by bending a copper-plated member in a plate form. Both the mounting face 523 and the end face 527 are thus plated with e.g., copper. Thus, when the solid electrolytic condenser A5 is mounted on a circuit substrate (Sa), Sd welding for bonding to a circuit substrate (Sa) can be attached not only to the mounting face 523 but also to the end face 527. This allows welding fillets having a high visibility to be formed.

This modified example also allows a solid electrolytic condenser A5 to have increased heat resistance as well as decreased ESR.

Figure 12:
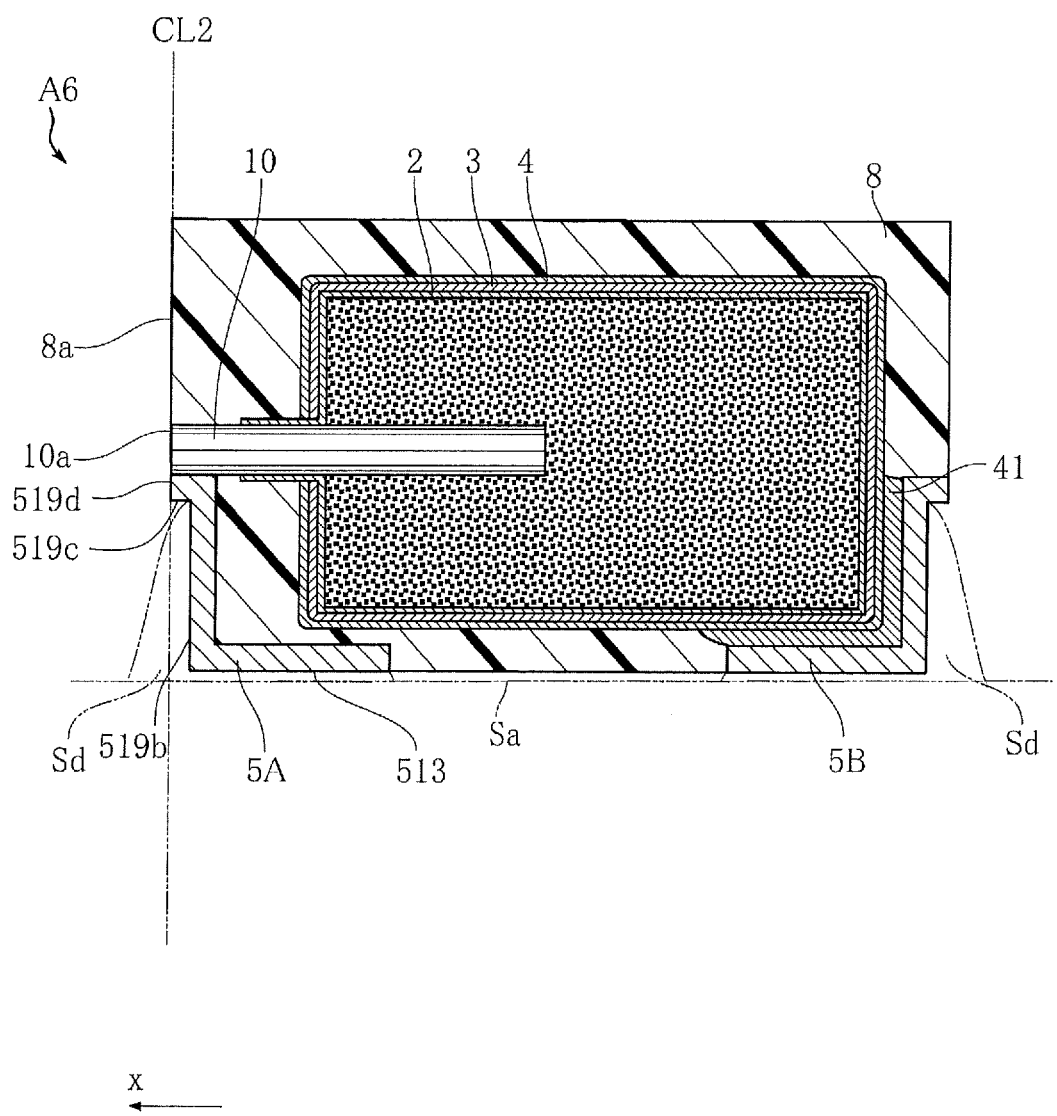
FIG. 12 shows a sectional view of a sixth modified example of a solid electrolytic condenser according to the present invention.

FIG. 12 shows a sixth modified example of a solid electrolytic condenser according to the present invention. The solid electrolytic condenser A6 shown in FIG. 12 differs from the embodiments and modified examples described above, in terms of the shapes of the cathode terminal 5A and the anode terminal 5B.

In this modified example, the cathode terminal 5A is also bonded to the cathode wire 10. The cathode terminal 5A has a mounting face 513, exposed faces 519b and 519c, and an end face 519d. The mounting face 513 extends out along the x-direction. The exposed face 519b is directed toward the x-direction and connected to the mounting face 513. The exposed face 519c extends out along the x-direction in connection to the exposed face 519b. The end face 519d is on the same plane with the end face 10a of the cathode wire 10, in connection to the exposed face 519c. The anode terminal 5B has the same shape as the cathode terminal 5A.

The solid electrolytic condenser A6 is obtained by cutting along the cutting line CL2. The cathode terminal 5A may be formed by bending a copper-plated member in a plate form. Thus, all of the mounting face 513, and the exposed faces 519b and 519c may be plated with copper. Accordingly, when the solid electrolytic condenser A6 is mounted on a circuit substrate (Sa), Sd welding for bonding to a circuit substrate (Sa) can be attached not only to the mounting face 513 but also to the exposed faces 519b and 519c. This allows welding fillets having a high visibility to be formed on a cathode terminal 5A. For the same reasons, welding fillets having a high visibility can also be formed on an anode terminal 5B.

This modified example also allows a solid electrolytic condenser A6 to have increased heat resistance as well as decreased ESR.

Figure 13:
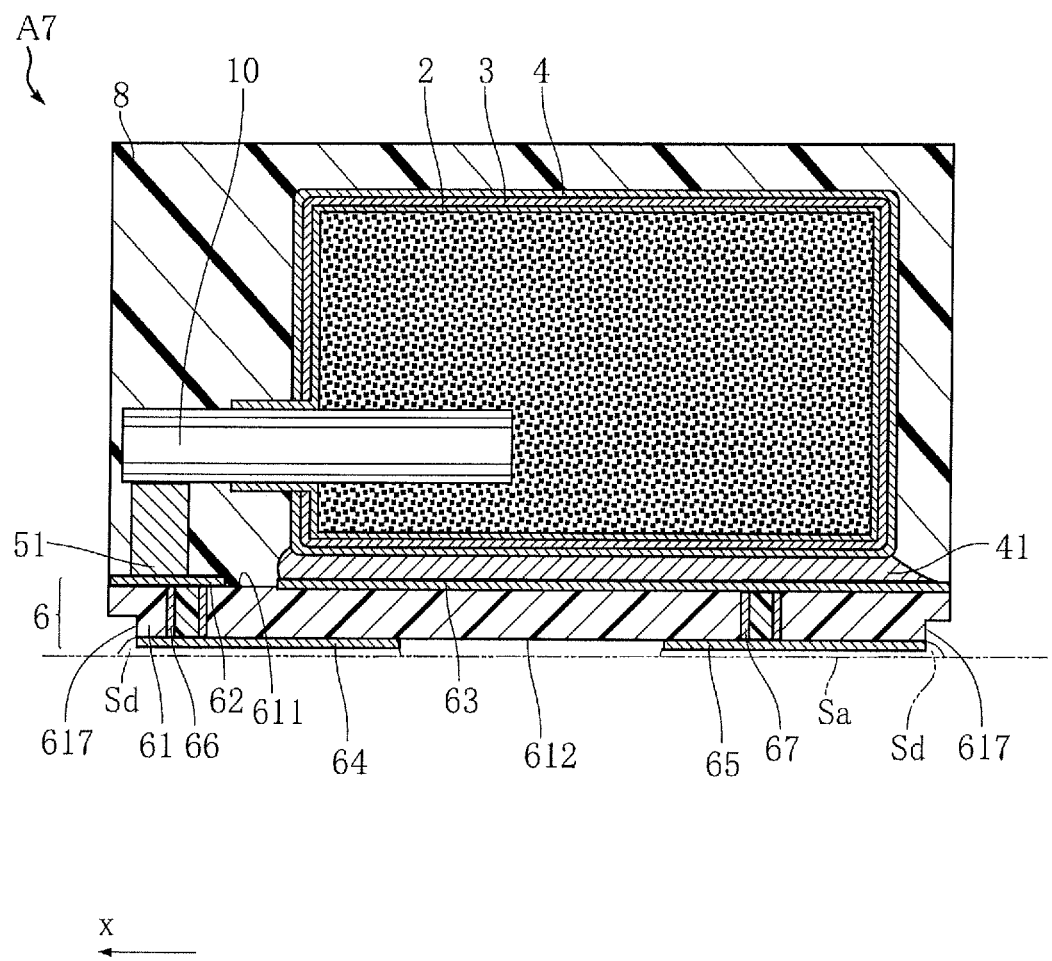
FIG. 13 shows a sectional view of a seventh modified example of a solid electrolytic condenser according to the present invention.

FIG. 13 shows a seventh modified example of a solid electrolytic condenser according to the present invention. The solid electrolytic condenser A7 shown in FIG. 13 differs from the embodiments and the modified examples described above in that it has no cathode terminal 5A and anode terminal 5B, but has a printed substrate 6. Also, for the solid electrolytic condenser A7, the cathode wire 10 does not protrude from the center portion of the face 11a of the porous sintered body 1, but protrudes from the portion off the center of the face 11a.

The printed substrate 6 includes a substrate 61, a surface cathode film 62, a surface anode film 63, a mounted cathode film 64, a mounted anode film 65, and penetrated hole electrodes 66 and 67.

The substrate 61 may be made of glass epoxy resin. The substrate 61 has a first face 611 directed toward the cathode wire 10, and a second face 612 that is on the opposite side of the first face 611. On the substrate 61 is formed a stepped part 617. In the stepped part 617, the end portion in the x-direction of a second face 612 is dented from the second face 612 to the first face 611.

The materials constituting the surface cathode film 62, the surface anode film 63, the mounted cathode film 64 and the mounted anode film 65 may be selected form conductive materials such as Cu, Au, Ag, Al and Ni.

Both the surface cathode film 62 and the surface anode film 63 are formed on the first face 611. In this embodiment, the surface cathode film 62 supports the conductive member 51. Therefore, the surface cathode film 62 is electrically connected to the cathode wire 10 via the conductive member 51.

The surface anode film 63 is bonded to the anode conductor layer 4 via the conductive adhesive layer 41. Thus, the surface anode film 63 is electrically connected to the anode conductor layer 4 or the solid electrolytic layer 3 via the conductive adhesive layer 41. The surface anode film 63 makes up the majority of the first face 611. This is advantageous for reducing the ESR.

The mounted cathode film 64 and the mounted anode film 65 are formed on the second face 612. The mounted cathode film 64 is electrically connected to the surface cathode film 62 via the penetrated hole electrode 66 that is formed on the substrate 61. Therefore, the mounted cathode film 64 is electrically connected to the cathode wire 10. The mounted anode film 65 is electrically connected to the surface anode film 63 via the penetrated hole electrode 67 that is formed on the substrate 61. Accordingly, the mounted anode film 65 is electrically connected to the anode conductor layer 4 or the solid electrolytic layer 3. The mounted cathode film 64 and the mounted anode film 65 are bonded to a circuit substrate (Sa) via Sd welding, whereby the solid electrolytic condenser A7 is mounted on the circuit substrate (Sa).

When the solid electrolytic condenser A7 is mounted on a circuit substrate (Sa), Sd welding is not attached to the substrate 61, but is only attached to the mounted cathode film 64 or the mounted anode film 65. Further, on the substrate 61 is formed a stepped part 617. Thus, according to the solid electrolytic condenser A7, the welding fillet can be formed on the area that overlaps with the substrate 61 or the resin package 8 in the x-direction. This makes it possible to enhance the mounting density of the solid electrolytic condenser A7.

This modified example also allows a solid electrolytic condenser A7 to have increased heat resistance as well as decreased ESR.

Figure 14:
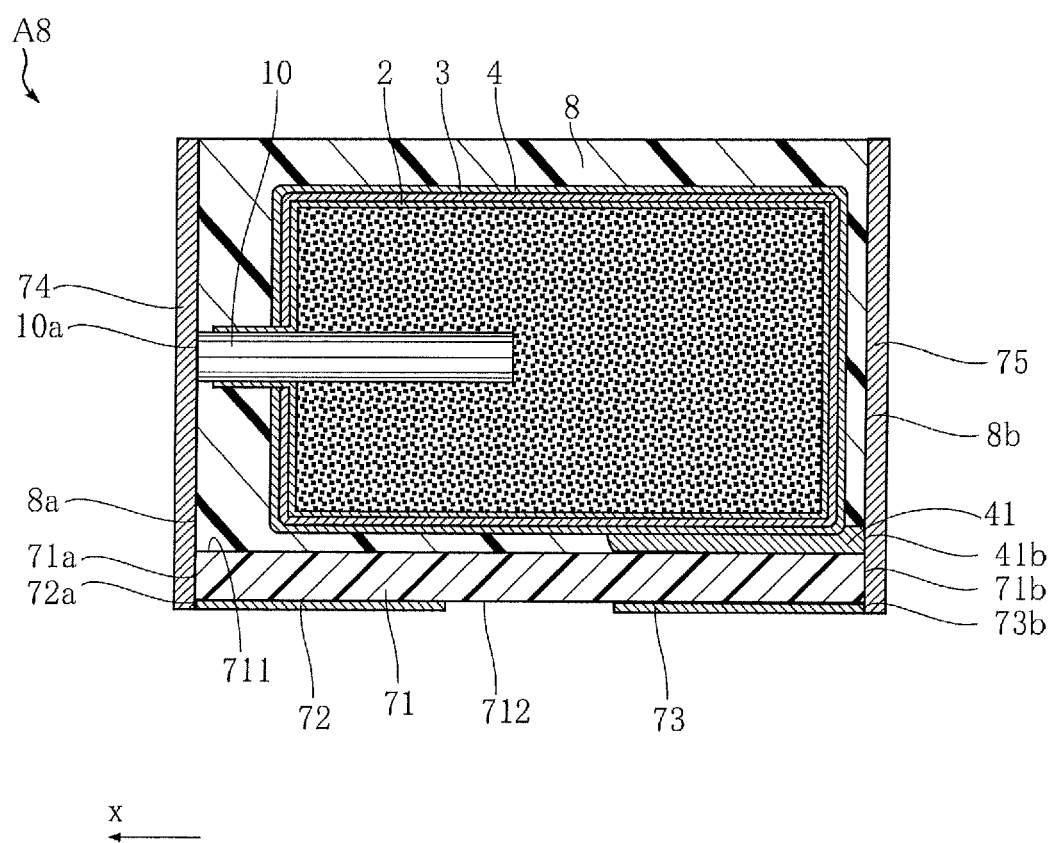
FIG. 14 shows a sectional view of a eighth modified example of a solid electrolytic condenser according to the present invention.

FIG. 14 shows an eighth modified example of a solid electrolytic condenser according to the present invention. The solid electrolytic condenser A8 shown in FIG. 14 has a substrate 71, a mounted cathode film 72, a mounted anode film 73, a side cathode film 74 and a side anode film 75.

The substrate 71 may be made of glass epoxy resin. The substrate 71 may have a thickness of 50 μm. No penetrated hole electrode is formed on the substrate 71. The substrate 71 has a first face 711 directed toward the cathode wire 10, and a second face 712 that is on the opposite side of the first face 711. The first face 711 is bonded to the anode conductor layer 4 via the conductive adhesive layer 41.

Both the mounted cathode film 72 and the mounted anode film 73 are formed on the second face 712. The materials constituting the mounted cathode film 72 and the mounted anode film 73 may be selected from conductive materials such as Cu, Au, Ag, Al and Ni.

The end face 10*a* of the cathode wire 10, the end face 8*a* of the resin package 8, the end face 71*a* of the substrate 71 and the end face 72*a* of the mounted cathode film 72 are on the same plane. Also, the end face 8*b* of the resin package 8, the end face 41*b* of the conductive adhesive layer 41, the end face 71*b* of the substrate 71 and the end face 73*b* of the mounted anode film 73 are on the same plane.

The side cathode film 74 covers the end faces 10*a*, 8*a*, 71*a* and 72*a*. The side cathode film 74 comes into contact with both the cathode wire 10 and the mounted cathode film 72. Thus, the mounted cathode film 72 is electrically connected to the cathode wire 10 via the side cathode film 74.

The side anode film 75 covers the end faces 8*b*, 41*b*, 71*b* and 73*b*. The side anode film 75 comes into contact with both the conductive adhesive layer 41 and the mounted anode film 73. Therefore, the mounted anode film 73 is electrically connected to the anode conductor layer 4 or the solid electrolytic layer 3 via the side anode film 75 and the conductive adhesive layer 41.

Figure 15:
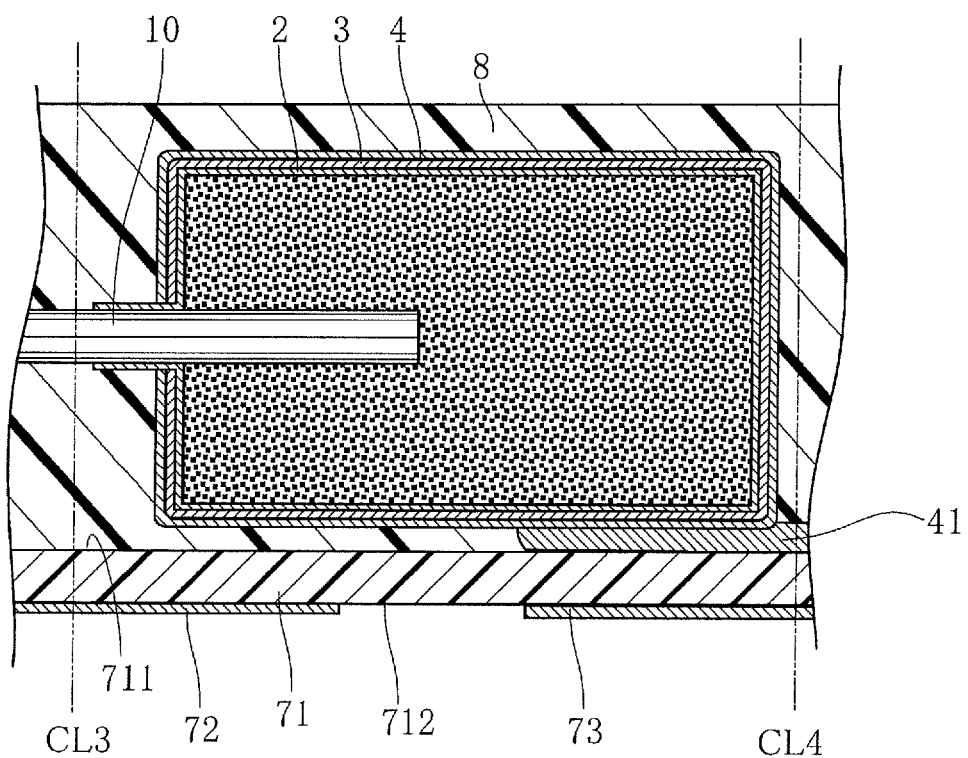
FIG. 15 shows a sectional view of an illustrative method for preparing a eighth modified example of a solid electrolytic condenser according to the present invention.
Figure 16:
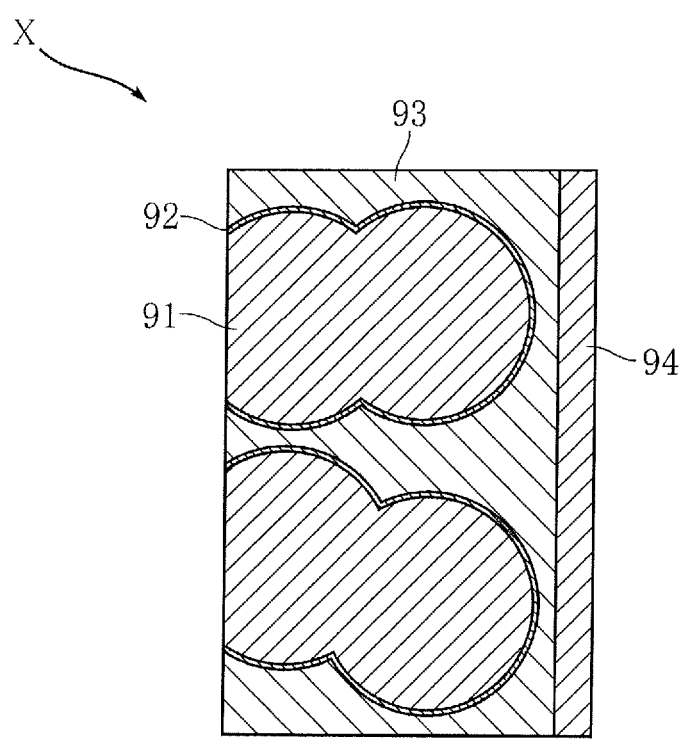
FIG. 16 is an enlarged sectional view of the principal part of a conventional illustrative solid electrolytic condenser.

Referring to FIG. 15, methods for preparing a solid electrolytic condenser A8 are briefly described.

First, on the porous sintered body 1 are stacked a dielectric layer 2, a solid electrolytic layer 3 and an anode conductor layer 4. Next, via a conductive adhesive layer 41, the substrate 71 on which an anode conductor layer 4, a mounted cathode film 72 and a mounted anode film 73 are formed are bonded thereto. Then, the porous sintered body 1 is covered with a resin package 8 to obtain an intermediate product as shown in FIG. 15. Subsequently, the intermediate product are cut along the cutting lines CL3 and CL4 to form the end faces 10*a*, 8*a*, 71*a*, 72*a*, and the end faces 8*b*, 41*b*, 71*b*, 73*b* that are shown in FIG. 14. Thereafter, the side cathode film 74 and the side anode film 75 are formed by plating to obtain the solid electrolytic condenser A8.

This modified example also allows a solid electrolytic condenser A8 to have increased heat resistance as well as decreased ESR.

While the present invention has been described and illustrated with respect to a number of embodiments of the invention, it will be apparent to those skilled in the art that variations and modifications are possible without deviating from the broad principles and teachings of the present invention, which is defined by the claims appended hereto.

What is claimed:
1. A solid electrolytic condenser comprising:
    a porous sintered body made of a valve action metal;
    a dielectric layer covering at least a portion of the porous sintered body; and
    a solid electrolytic layer covering at least a portion of the dielectric layer,
    wherein the solid electrolytic layer is composed of an anion exchange resin,
    wherein the anion exchange resin has $-SO_3^-NH_3^+CH_2CH_2NH_3^+$ as an ion exchange group.
2. The solid electrolytic condenser of claim 1, wherein the anion exchange resin has a copolymer of tetrafluoroethylene with perfluorovinylether.
3. The solid electrolytic condenser of claim 1, wherein the anion exchange resin has a copolymer of tetrafluoroethylene with perfluorovinylether, and $-SO_3^-NH_3^+CH_2CH_2NH_3^+$ as an ion exchange group, that are represented by Formula 1 below:

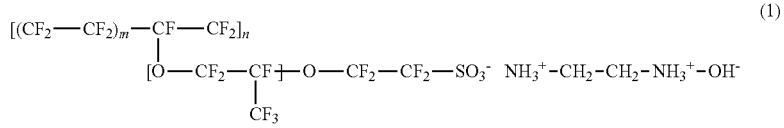

wherein m and n are an integer.

4. The solid electrolytic condenser of claim 1, wherein the anion exchange resin has OH$^-$ as an anion.
5. The solid electrolytic condenser of claim 1, wherein the anion exchange resin has a grid structure where a number of fluorocarbon clusters are bonded to each other.
6. The solid electrolytic condenser of claim 1, wherein the anion exchange resin is a quatemarized ammonium-based anion exchange resin.
7. The solid electrolytic condenser of claim 6, wherein the anion exchange resin is a quatemarized poly(4-vinylpyridine) represented by Formula 2 below:

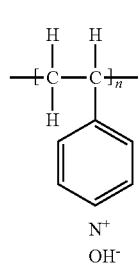 (2)

wherein n is an integer.

8. The solid electrolytic condenser of claim 7, wherein the anion exchange resin has OH⁻ as an anion.

9. The solid electrolytic condenser of claim 2, wherein the anion exchange resin has OH⁻ as an anion.

10. The solid electrolytic condenser of claim 3, wherein the anion exchange resin has OH⁻ as an anion.

11. The solid electrolytic condenser of claim 2, wherein the anion exchange resin has a grid structure where a number of fluorocarbon clusters are bonded to each other.

12. The solid electrolytic condenser of claim 3, wherein the anion exchange resin has a grid structure where a number of fluorocarbon clusters are bonded to each other.

13. The solid electrolytic condenser of claim 4, wherein the anion exchange resin has a grid structure where a number of fluorocarbon clusters are bonded to each other.

\* \* \* \* \*